(12) United States Patent
Saeki et al.

(10) Patent No.: US 11,785,091 B2
(45) Date of Patent: Oct. 10, 2023

(54) INFORMATION PROCESSING SYSTEM, INFORMATION PROCESSING METHOD AND INFORMATION PROCESSING APPARATUS

(71) Applicant: DAIKIN INDUSTRIES, LTD., Osaka (JP)

(72) Inventors: Mao Saeki, Osaka (JP); Kenta Nohara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/757,837

(22) PCT Filed: Sep. 30, 2020

(86) PCT No.: PCT/JP2020/037165
§ 371 (c)(1),
(2) Date: Jun. 22, 2022

(87) PCT Pub. No.: WO2021/131211
PCT Pub. Date: Jul. 1, 2021

(65) Prior Publication Data
US 2023/0042636 A1 Feb. 9, 2023

(30) Foreign Application Priority Data
Dec. 27, 2019 (JP) .................................. 2019-238424

(51) Int. Cl.
*H04L 67/12* (2022.01)
*G06Q 30/0601* (2023.01)

(52) U.S. Cl.
CPC ......... *H04L 67/12* (2013.01); *G06Q 30/0601* (2013.01)

(58) Field of Classification Search
CPC ....... H04L 67/12; H04L 67/56; H04L 67/303; G06Q 30/0601
See application file for complete search history.

(56) References Cited

U.S. PATENT DOCUMENTS

2011/0184586 A1 7/2011 Asano et al.
2019/0325666 A1 10/2019 Teraoka

FOREIGN PATENT DOCUMENTS

JP   2002-354556   * 12/2002
JP   2013-092845      5/2013

OTHER PUBLICATIONS

International Search Report for PCT/JP2020/037165 dated Dec. 22, 2020.

(Continued)

*Primary Examiner* — Kim T Nguyen
(74) *Attorney, Agent, or Firm* — IPUSA, PLLC

(57) ABSTRACT

An information processing system includes a first server, a second server connected to the first server, and a control apparatus connected to the second server and configured to control one or more devices. The first server includes: a first receiving unit configured to receive data about the one or more devices from a terminal connected to the first server; and a creating unit configured to create first data for the second server and second data for the control apparatus, from the received data about the one or more devices. The second server includes: a registration unit configured to save the first data in a storage unit; and a transmitting unit configured to transmit the second data to the control apparatus.

14 Claims, 12 Drawing Sheets

(56) References Cited

OTHER PUBLICATIONS

Extended European Search Report for 20907269.3 dated Dec. 5, 2022.
International Preliminary Report on Patentability for PCT/JP2020/037165 dated Jul. 7, 2022.

* cited by examiner

FIG.4

| DATA ITEM | Input/Output | Data Type | Property (ATTRIBUTE VALUES) | | | | | | | | | | ... | PROTOCOL CONVERSION INFORMATION |
|---|---|---|---|---|---|---|---|---|---|---|---|---|---|---|
| | | | CURRENT VALUE | R/W | MINIMUM VALUE | R/W | MAXIMUM VALUE | R/W | INITIAL VALUE | R/W | STEP VALUE | R/W | | |
| ON AND OFF | Output | Binary | 1 | RW | 0 | R | 1 | R | 0 | R | - | - | ... | ... |
| | Input | | 1 | R | - | - | - | - | - | - | - | - | | ... |
| PRESET TEMPERATURE | Output | Analog | 27 | RW | ... | R | ... | R | ... | R | 0.1 | R | ... | ... |
| | Input | | 1 | R | - | - | - | - | - | - | - | - | | ... |
| INTAKE TEMPERATURE | Input | Analog | 26 | R | - | - | - | - | - | - | 0.1 | R | ... | ... |

MODEL INFORMATION

FIG.5A

VERSION MANAGEMENT DATA

| CREATION DATE AND TIME | CREATOR | CLASSI-FICATION | DEVICE TYPE NAME | VERSION | HORSE POWER | DEVICE TYPE CODE | PRODUCT CODE | EQUIPMENT DETERMINATION INFORMATION | ... |
|---|---|---|---|---|---|---|---|---|---|
| ... | ... | ... | ... | ... | ... | ... | ... | ... | ... |

FIG.5B

DEVICE TYPE MASTER MANAGEMENT DATA

| CREATION DATE AND TIME | CREATOR | CLASSI-FICATION | MODEL INFORMA-TION | DEVICE TYPE NAME | HORSE POWER | DEVICE TYPE CODE | PRODUCT CODE | EQUIPMENT DETERMINA-TION INFORMATION | ... |
|---|---|---|---|---|---|---|---|---|---|
| ... | ... | ... | ... | ... | ... | ... | ... | ... | ... |

FIG.5C

COMMUNICATION PROFILE MANAGEMENT DATA

| COMMUNI-CATION PROFILE | CREATION DATE AND TIME | CREATOR | CLASSIFI-CATION | DEVICE TYPE NAME | ... |
|---|---|---|---|---|---|
| ... | ... | ... | ... | ... | ... |

FIG.6A

COMMON DATA

| CREATION DATE AND TIME | CLASSIFI-CATION | MODEL INFORMA-TION | MODEL UPDATE DATE AND TIME | DEVICE ID | ... |
|---|---|---|---|---|---|
| ... | ... | ... | ... | ... | ... |

FIG.6B

DEVICE DATA

| CREATION DATE AND TIME | DEVICE ID | EDGE ID | DEVICE TYPE NAME | VERSION | ... |
|---|---|---|---|---|---|
| ... | ... | ... | ... | ... | ... |

FIG.6C

DEVICE OPERATION DATA

| CREATION DATE AND TIME | CLASSIFI-CATION | DEVICE ID | COLLECTED DATA | ... |
|---|---|---|---|---|
| ... | ... | ... | ... | ... |

INFORMATION PROCESSING SYSTEM, INFORMATION PROCESSING METHOD AND INFORMATION PROCESSING APPARATUS

TECHNICAL FIELD

The present disclosure relates to an information processing system, an information processing method, and an information processing apparatus.

BACKGROUND ART

There is known a technique that extracts merchandise that is included in both of store-based merchandise information stored in a first server group and entire merchandise information stored in a second server and that is to be transmitted to a third server providing an online grocery shopping site, and generates merchandise information for setting whether the extracted merchandise is to be handled on the online grocery shopping site (for example, see Patent Document 1).

RELATED-ART DOCUMENTS

Patent Documents

[Patent Document 1] Japanese Laid-Open Patent Publication No. 2013-92845

SUMMARY OF THE INVENTION

Problem to be Solved by the Invention

In Patent Document 1, merchandise information handled by the online grocery shopping site is generated from the store-based merchandise information and the entire merchandise information, but Patent Document 1 is silent on generating data for a control apparatus for controlling a device and data for a server connected to the control apparatus from the data about the device.

The present disclosure provides an information processing system, an information processing method, and an information processing apparatus configured to generate data for a control apparatus for controlling a device and data for a server connected to the control apparatus from data about the device.

Means to Solve the Problem

An information processing system according to the present disclosure includes a first server, a second server connected to the first server, and a control apparatus connected to the second server and configured to control one or more devices. The first server includes: a first receiving unit configured to receive data about the one or more devices from a terminal connected to the first server; and a creating unit configured to create first data for the second server and second data for the control apparatus, from the received data about the one or more devices. The second server includes: a registration unit configured to save the first data in a storage unit; and a transmitting unit configured to transmit the second data to the control apparatus.

According to the present disclosure, the first data for the second server and the second data for the control apparatus can be created from the data about the one or more devices.

The creating unit may create third data including the first data and the second data, and the second server may include a second receiving unit configured to receive the third data from the first server.

According to the present disclosure, the third data is created, and the third data is transmitted, so that the first data for the second server and the second data for the control apparatus can be managed at the same time.

The first server may include a storing unit configured to store, in a case where the third data is created, the data about the one or more devices in a predetermined first folder or directory indicating that the third data is successfully created, and configured to store, in a case where the third data cannot be created, the data about the one or more devices in a predetermined second folder or directory indicating that creation of the third data has failed.

According to the present disclosure, in accordance with whether creation of the third data including the first data for the second server and the second data for the control apparatus has succeeded or failed, the data about the one or more devices can be stored to the first folder or directory, or to the second folder or directory, and whether the third data has been created can be confirmed.

The information processing system may include a plurality of second servers.

According to the present disclosure, the information processing system can include a plurality of second servers. When the plurality of second servers are included, the third data is created by the first server instead of being created by the plurality of second servers, so that the data about the one or more devices can be managed in a unified manner in the present system.

The second data may include information indicated by the first data and conversion information between a communication protocol used by the control apparatus and a communication protocol used by the one or more devices, and may have a data size that is less than a data size of the first data.

According to the present disclosure, the second data can include the information indicated by the first data and the conversion information between the communication protocol used by the control apparatus and the communication protocol used by the one or more devices, and the data size of the second data can be reduced to be less than the data size of the first data.

The transmitting unit may be further configured to transmit the first data to the control apparatus.

According to the present disclosure, not only the second data but also the first data can be transmitted to the control apparatus.

The registration unit may be further configured to save the second data to the storage unit for each type of the one or more devices, and the transmitting unit may identify a device of the one or more devices that is controlled by the control apparatus, and transmit the second data corresponding to a type of the identified device to the control apparatus.

According to the present disclosure, the second data corresponding to the type of the device can be transmitted to the control apparatus.

An information processing method is used for an information processing system including a first server, a second server connected to the first server, and a control apparatus connected to the second server and configured to control one or more devices. The first server executes: a first receiving procedure of receiving data about the one or more devices from a terminal connected to the first server; and a creating procedure of creating first data for the second server and second data for the control apparatus, from the received data about the one or more devices. The second server executes: a registration procedure of saving the first data in a storage unit; and a transmitting procedure of transmitting the second data to the control apparatus.

According to the present disclosure, the first data for the second server and the second data for the control apparatus can be created from the data about the one or more devices.

An information processing apparatus is connected to a control apparatus configured to control one or more devices and a terminal configured to create information about the one or more devices, and the information processing apparatus includes a receiving unit configured to receive data about the one or more devices from the terminal, a creating unit configured to create first data for the information processing apparatus and second data for the control apparatus, from the received data about the one or more devices, a registration unit configured to save the first data in a storage unit, and a transmitting unit configured to transmit the second data to the control apparatus.

According to the present disclosure, the first data for the second server and the second data for the control apparatus can be created from the data about the one or more devices.

The creating unit may create third data including the first data and the second data.

According to the present disclosure, the third data is created, and the third data is transmitted, so that the first data for the second server and the second data for the control apparatus can be managed at the same time.

The information processing apparatus may include a storing unit configured to store, in a case where the third data is created, the data about the one or more devices in a predetermined first folder or directory indicating that the third data is successfully created, and configured to store, in a case where the third data cannot be created, the data about the one or more devices in a predetermined second folder or directory indicating that creation of the third data has failed.

According to the present disclosure, in accordance with whether creation of the third data including the first data for the second server and the second data for the control apparatus has succeeded or failed, the data about the one or more devices can be saved to the first folder or directory, or to the second folder or directory, and whether the third data has been created can be confirmed.

The second data may include information indicated by the first data and conversion information between a communication protocol used by the control apparatus and a communication protocol used by the one or more devices, and may have a data size that is less than a data size of the first data.

According to the present disclosure, the second data can include the information indicated by the first data and the conversion information between the communication protocol used by the control apparatus and the communication protocol used by the one or more devices, and the data size of the second data can be reduced to be less than the data size of the first data.

The transmitting unit may be further configured to transmit the first data to the control apparatus.

According to the present disclosure, not only the second data but also the first data can be transmitted to the control apparatus.

The registration unit may be further configured to save the second data to the storage unit for each type of the one or more devices, and the transmitting unit may identify a device of the one or more devices that is controlled by the control apparatus, and transmit the second data corresponding to a type of the identified device to the control apparatus.

According to the present disclosure, the second data corresponding to the type of the device can be transmitted to the control apparatus.

An information processing method is executed by an information processing apparatus connected to a control apparatus configured to control one or more devices and a terminal configured to create information about the one or more devices. The information processing method causing the information processing apparatus to perform a receiving procedure of receiving data about the one or more devices from the terminal, a creation procedure of creating first data for the information processing apparatus and second data for the control apparatus, from the received data about the one or more devices, a registration procedure of saving the first data in a storage unit, and a transmitting procedure of transmitting the second data to the control apparatus.

According to the present disclosure, the first data for the second server and the second data for the control apparatus can be created from the data about the one or more devices.

BRIEF DESCRIPTION OF DRAWINGS

FIG. 4 is a drawing illustrating an example of a device model.

FIG. 5A is a drawing illustrating an example of version management data stored in a device type master table.

FIG. 5B is a drawing illustrating an example of device type master management data stored in the device type master table.

FIG. 5C is a drawing illustrating an example of communication profile management data stored in the device type master table.

FIG. 6A is a drawing illustrating an example of common data stored in a device master table.

FIG. 6B is a drawing illustrating an example of device data stored in the device master table.

FIG. 6C is a drawing illustrating an example of device operation data stored in the device master table.

MODE FOR CARRYING OUT THE INVENTION

Figure 1:
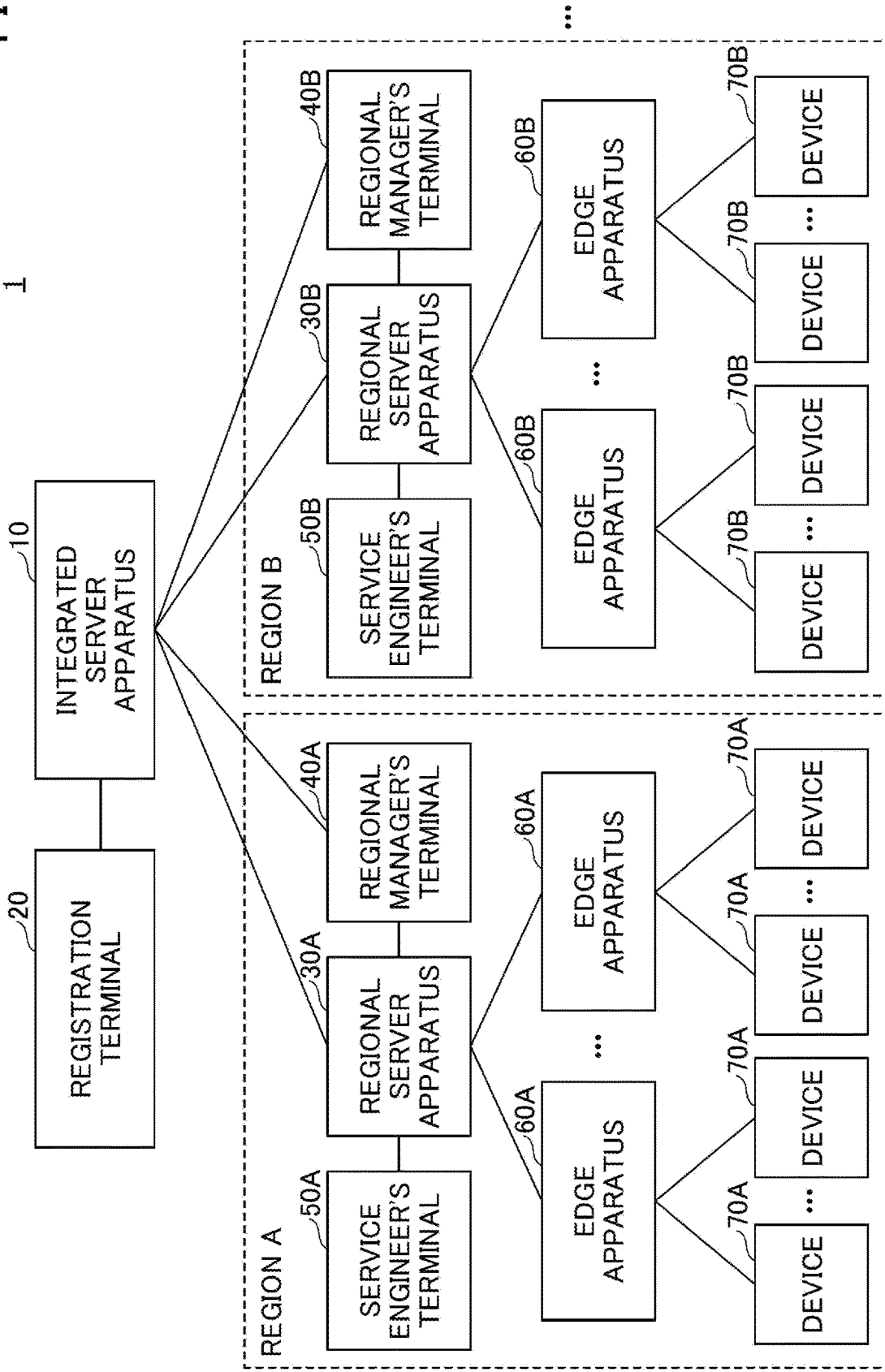
FIG. 1 is a drawing illustrating an example of the entire configuration of a device management system according to the present embodiment.

Hereinafter, an embodiment is explained in detail.
<Entire Configuration>
FIG. 1 is a drawing illustrating an example of the entire configuration of a device management system 1 according to the present embodiment. The device management system 1 includes an integrated server apparatus 10, a registration terminal 20, regional server apparatuses 30A to 30B, a regional manager's terminal 40A to a regional manager's terminal 40B, a service engineer's terminal 50A to a service engineer's terminal 50B, edge apparatuses 60A to 60B, devices 70A to 70B, and the like. The device management system 1 is an example of an information processing system.

In this case, the regional server apparatus 30A, the regional manager's terminal 40A, the service engineer's terminal 50A, the edge apparatus 60A, and the device 70A are installed in a region A. Likewise, the regional server apparatus 30B, the regional manager's terminal 40B, the service engineer's terminal 50B, the edge apparatus 60B, and the device 70B are installed in a region B. The regions are geographical ranges determined in advance, and for example, it is considered that the region A may be "Japan" and the region B may be "Europe". In FIG. 1, only the region A and the region B are illustrated, but there are other regions such as a region C and a region D.

Hereinafter, a regional server apparatus, a regional manager's terminal, a service engineer's terminal, an edge apparatus, and a device installed in any given region are referred to as a regional server apparatus 30, a regional manager's terminal 40, a service engineer's terminal 50, an edge apparatus 60, and a device 70, respectively.

The integrated server apparatus 10 is a server that manages the regional server apparatus 30 in each region. When the integrated server apparatus 10 receives device model data from the registration terminal 20, the integrated server apparatus 10 creates a file (this file may be hereinafter referred to as a "provision file") that includes device type master data indicative of device model data for the regional server apparatus 30 and communication profile data indicative of device model data for the edge apparatus 60. In this case, the device model defines, e.g., what kind of data can be collected from the device 70, sensors provided in the device 70, and the like. Specific examples of the device model are explained later. The integrated server apparatus 10 is an example of a first server.

The registration terminal 20 is a terminal with which device model data is created and with which the created device model data is registered to the integrated server apparatus 10. For example, a PC (personal computer), a tablet terminal, a smartphone, or the like can be used for the registration terminal 20.

The regional server apparatus 30 is a server that manages the edge apparatuses 60 installed in the regions and the devices 70 connected to the edge apparatuses 60. Once the device type master data is registered, the regional server apparatus 30 can collect data from the device 70 corresponding to the device type master data via the edge apparatus 60. The regional server apparatus 30 is an example of a second server.

The regional manager's terminal 40 is a terminal used by the manager or the like of the regional server apparatus 30. The regional manager's terminal 40 acquires the provision file from the integrated server apparatus 10, and transmits the acquired provision file to the regional server apparatus 30. For example, a PC, a tablet terminal, a smartphone, or the like can be used for the regional manager's terminal 40.

The service engineer's terminal 50 is a terminal that is used by a service engineer who performs installation and the like of the device 70. For example, in a case where the device 70 is newly installed, the service engineer's terminal 50 registers the device 70 in the regional server apparatus 30. For example, a PC, a tablet terminal, a smartphone, or the like can be used for the service engineer's terminal 50.

The edge apparatus 60 is an apparatus that controls one or more devices 70 connected to the edge apparatus 60. Once information indicated by the communication profile data is reflected, the edge apparatus 60 can collect data from the device 70 corresponding to the information indicated by the communication profile data. The edge apparatus 60 is an example of a control apparatus.

The device 70 is, for example, an air conditioner (an outdoor unit, an indoor unit, and the like). The device 70 is constituted by various units, modules, and the like, and also includes sensors and the like for sensing these units, modules, and the like. For example, at a cycle determined in advance, the device 70 transmits various kinds of data (information indicative of ON/OFF of the power source, information indicative of the preset temperature, information indicative of the intake temperature, and the like) to the edge apparatus 60. The data is collected by the regional server apparatus 30 via the edge apparatus 60 as described above.

For example, one or more edge apparatuses 60 are installed in a building, and one or more devices 70 installed inside and outside of the building are controlled by the edge apparatus 60.

The device management system 1 of FIG. 1 is an example, and it is to be understood that other configuration examples may be employed as appropriate. For example, the integrated server apparatus 10 and at least one regional server apparatus 30 may be constituted by a single apparatus or a system. An apparatus constituted by the integrated server apparatus 10 and at least one regional server apparatus 30 is an example of an information processing apparatus.

For example, the regional manager's terminal 40 and the service engineer's terminal 50 may be the same terminal.

<Hardware Configuration>

Figure 2:
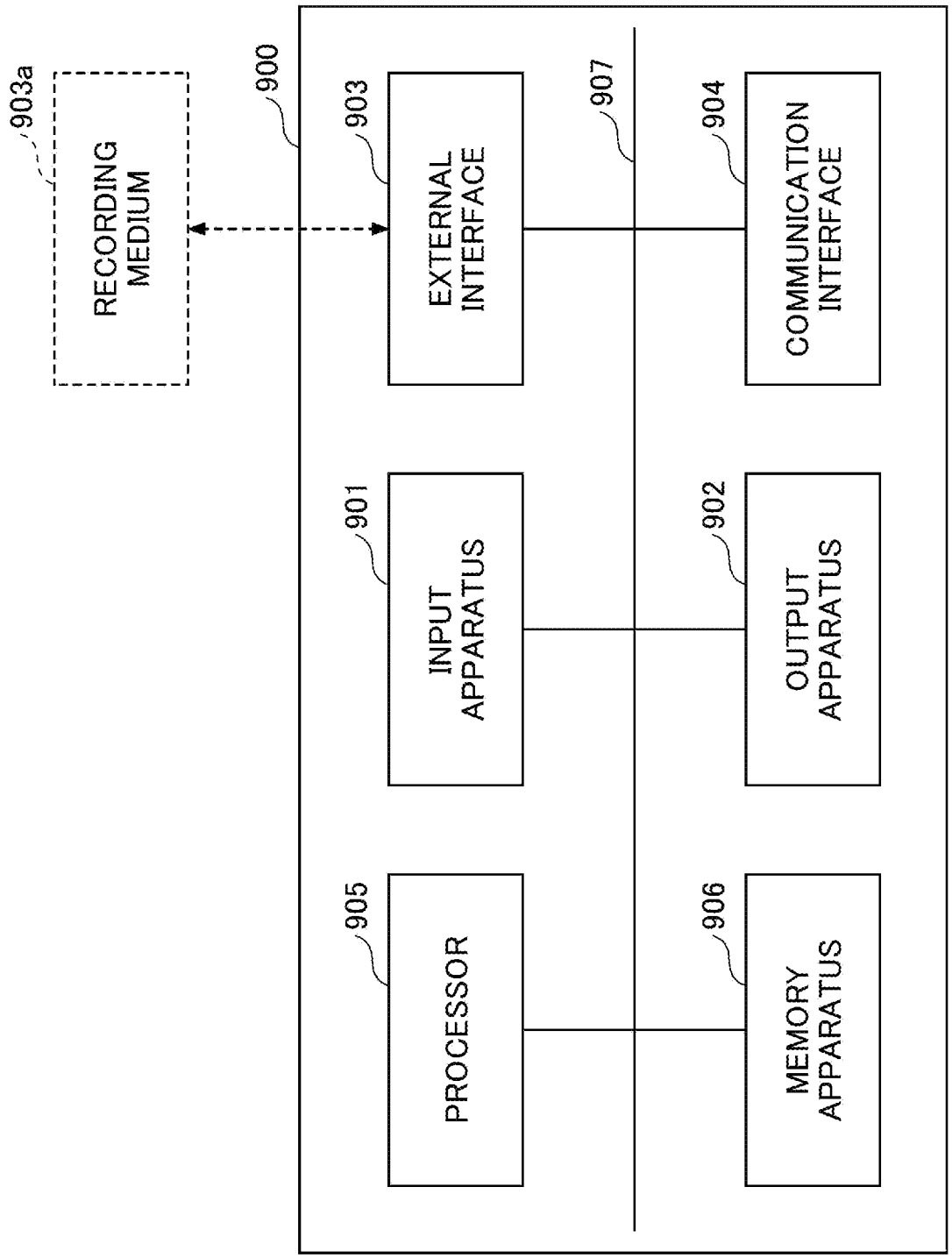
FIG. 2 is a drawing illustrating an example of a hardware configuration of a computer.

The integrated server apparatus 10, the registration terminal 20, the regional server apparatus 30, the regional manager's terminal 40, the service engineer's terminal 50, and the edge apparatus 60 of FIG. 1 are implemented by, for example, a computer 900 having a hardware configuration as illustrated in FIG. 2. The hardware configuration of the device 70 is omitted, but it is assumed that the device 70 has hardware resources capable of at least information processing.

FIG. 2 is a drawing illustrating an example of a hardware configuration of the computer 900. The computer 900 of FIG. 2 includes an input apparatus 901, an output apparatus 902, an external interface 903, a communication interface 904, a processor 905, a memory apparatus 906, and the like, which are connected to be able to mutually communicate with each other via a bus 907. The input apparatus 901 and the output apparatus 902 may be connected and used as necessary.

The input apparatus 901 is a touch panel, operation keys and buttons, a keyboard, a mouse, and the like used by the user to input various signals. The output apparatus 902 is constituted by a display of liquid crystal, organic EL, or the like that displays a screen, a speaker that outputs sound data such as voice and music, and the like. The communication interface 904 is an interface that connects the computer 900 to the communication network. The computer 900 can perform data communication via the communication interface 904.

The memory apparatus 906 is a non-volatile storage apparatus that stores programs and data. Examples of the memory apparatus 906 include an HDD, an SSD (solid state drive), a flash memory, a RAM, a ROM, and the like.

The external interface 903 is an interface with an external apparatus. External apparatuses includes a recording medium 903a and the like. The computer 900 can read and/or write the recording medium 903a via the external interface 903. The recording medium 903a includes a flexible disk, a CD, a DVD, an SD memory card, a USB memory, and the like.

The processor 905 is a computation device that achieves control and functions of the entire computer 900 by reading programs and data from the memory apparatus 906 and executing processing. Examples of the processor 905 include a CPU, a GPU, an FPGA, and the like.

The integrated server apparatus 10, the registration terminal 20, the regional server apparatus 30, the regional manager's terminal 40, the service engineer's terminal 50, and the edge apparatus 60 according to the present embodiment can achieve various types of processing such as processing explained later by executing a program or the like using hardware resources capable of information processing as described above.

<Functional Configuration>

Figure 3:
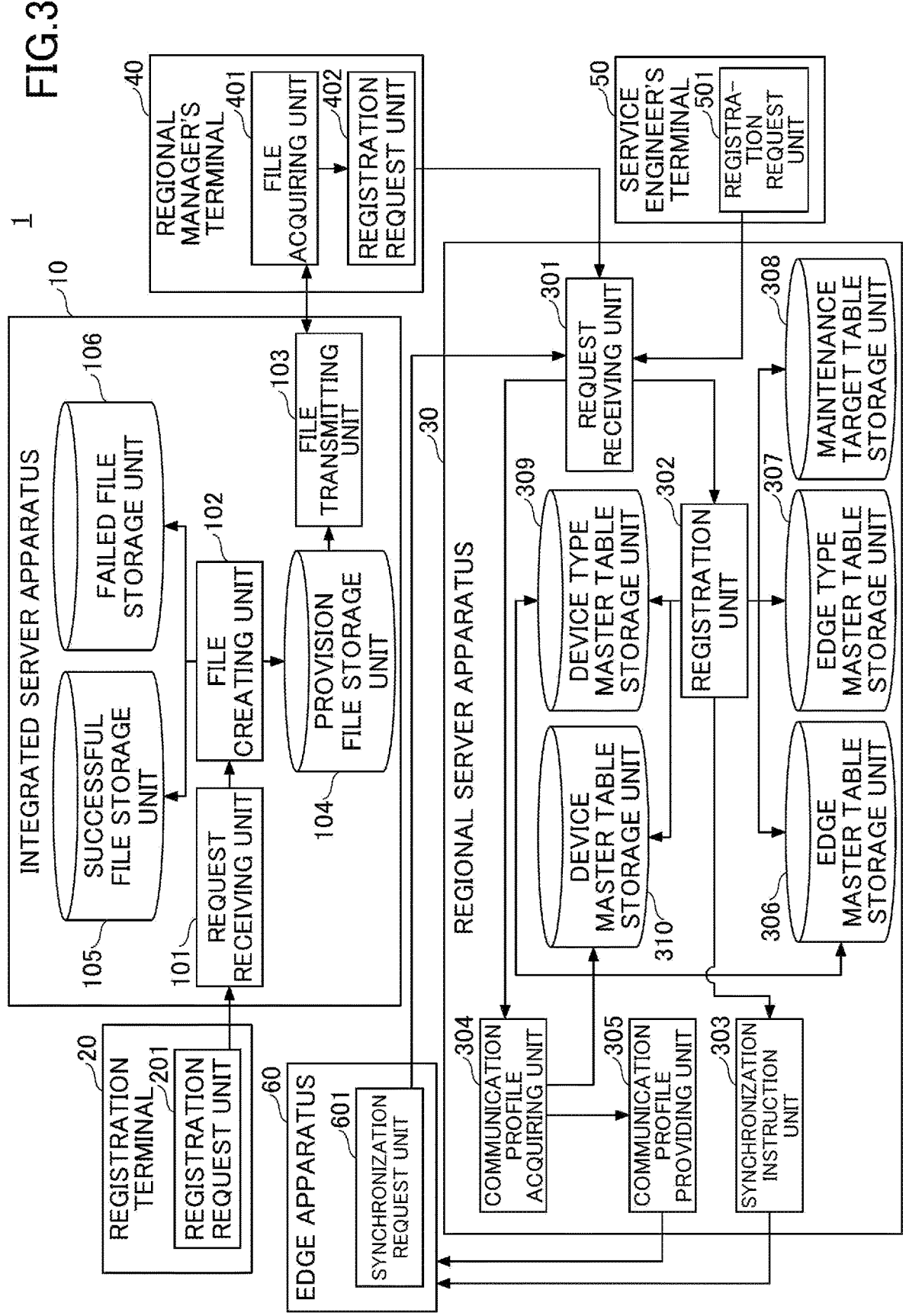
FIG. 3 is a drawing illustrating an example of a functional configuration of a device management system according to the present embodiment.

FIG. 3 is a drawing illustrating an example of the functional configuration of the device management system 1 according to the present embodiment.

The registration terminal 20 implements a registration request unit 201 by causing the computation device to execute the program. The registration request unit 201 transmits a device model registration request including device model data to the integrated server apparatus 10. The device model registration request is data for requesting the integrated server apparatus 10 to register the device model data, and is implemented by, for example, an HTTP request or the like. The device model data is data obtained by converting a device model into a predetermined data format such as a CSV format.

The integrated server apparatus 10 implements a request receiving unit 101, a file creating unit 102, and a file transmitting unit 103 by causing the computation device to execute the program. Furthermore, the integrated server apparatus 10 implements a provision file storage unit 104, a successful file storage unit 105, and a failed file storage unit 106 with the storage apparatus.

The request receiving unit 101 receives a device model registration request from the registration terminal 20.

Upon determining that the device model data included in the device model registration request is correct, the file creating unit 102 creates a provision file including device type master data and communication profile data from the device model data. This provision file is saved in the provision file storage unit 104. The device type master data is an example of first data, and the communication profile data is an example of second data. The provision file is an example of third data. The device model data being correct means that there is no error, no inconsistency, or the like in the values included in the device model data or between values, and means that, for example, there is consistency between specifying of a data type with respect to any given data item and the value of the data item.

In this case, the device type master data is created in a general-purpose data format such as JSON format or the like, and the communication profile data is created in a data format such as a CSV format or the like. Information included in the device type master data is also included in the communication profile data. The communication profile data also includes information that is not included in the device type master data (protocol conversion information explained later). The amount of information of the communication profile data is higher than the amount of information of the device type master data, but in a case where, for example, the communication profile data is a CSV format and the device type master data is a JSON format, the data size of the communication profile data is smaller than the data size of the device type master data, due to the difference in the data format.

In response to the provision file acquisition request from the regional manager's terminal 40, the file transmitting unit 103 acquires the provision file saved in the provision file storage unit 104, and transmits the provision file to the regional manager's terminal 40.

The provision file storage unit 104 stores the provision file. The successful file storage unit 105 stores the device model data that is determined to be correct. The failed file storage unit 106 stores the device model data that is not determined to be correct. The successful file storage unit 105 and the failed file storage unit 106 are implemented by, for example, folders of the file system (for example, folders of which the folder names are a "successful folder" and a "failed folder", respectively). The successful file storage unit 105 is an example of a first folder or directory, and the failed file storage unit 106 is an example of a second folder or directory.

The regional manager's terminal 40 implements a file acquiring unit 401 and a registration request unit 402 by causing the computation device to execute the program.

The file acquiring unit 401 transmits the provision file acquisition request to the integrated server apparatus 10. The provision file acquisition request is data for requesting the integrated server apparatus 10 to acquire the provision file, and is implemented by, for example, an HTTP request or the like.

The registration request unit 402 transmits the provision file registration request to the regional server apparatus 30. The provision file registration request is data for requesting the regional server apparatus 30 to register the provision file, and is implemented by, for example, an HTTP request or the like. The provision file registration request includes information described in the provision file acquired from the integrated server apparatus 10. This information includes information indicative of the device type master data and information indicative of the communication profile data.

The service engineer's terminal 50 implements a registration request unit 501 by causing the computation device to execute the program. The registration request unit 501 transmits the device registration request to the regional server apparatus 30. The device registration request is data for requesting the regional server apparatus 30 to register the device 70 (for example, the device 70 newly installed), and is implemented by, for example, an HTTP request or the like. The device registration request includes information about the device 70 of the registration target (which may be hereinafter referred to as "device information") and information about the edge apparatus 60 controlling the device 70 of the registration target (which may be hereinafter referred to as "edge information"). The device information includes, for example, the device type name and the like. The edge information includes, for example, an edge ID and the like.

The regional server apparatus 30 implements a request receiving unit 301, a registration unit 302, a synchronization instruction unit 303, a communication profile acquiring unit 304, and a communication profile providing unit 305 by causing the computation device to execute the program. The regional server apparatus 30 implements an edge master table storage unit 306, an edge type master table storage unit 307, a maintenance target table storage unit 308, a device type master table storage unit 309, and a device master table storage unit 310 with storage apparatus.

The request receiving unit 301 receives a provision file registration request from the regional manager's terminal 40, receives a device registration request from the service engineer's terminal 50, and receives a communication profile synchronization request (explained later) from the edge apparatus 60.

In a case where the request receiving unit 301 receives the provision file registration request, the registration unit 302 generates version management data, device type master management data, and communication profile management data from the information included in the provision file registration request, and stores them to the device type master table. The version management data, the device type master management data, and the communication profile management data stored in the device type master table is explained later.

In a case where the request receiving unit 301 receives the device registration request, the registration unit 302 issues the device ID of the device 70 of the registration target, creates maintenance target data, and stores the maintenance target data to the maintenance target table. The registration unit 302 generates common data, device data, and device acquisition data from the maintenance target data, and stores them to the device master table. The common data, the device data, and the device acquisition data stored in the device master table are explained later.

In a case where the common data, the device data, and the device acquisition data are stored to the device master table, the synchronization instruction unit 303 transmits the synchronization instruction to the edge apparatus 60. The synchronization instruction is an instruction for synchronizing information indicated by the communication profile management data. "Synchronizing" means that information indicated by the communication profile management data is reflected in the edge apparatus 60.

In a case where the request receiving unit 301 receives a communication profile synchronization request, the communication profile acquiring unit 304 acquires the communication profile management data from the device type master table.

The communication profile providing unit 305 transmits the communication profile management data acquired by the communication profile acquiring unit 304 to the edge apparatus 60.

The edge master table storage unit 306 stores an edge master table. The edge master table stores the edge ID and the edge type of the edge apparatus 60 installed in at least the region in question. The edge type means the type of the edge apparatus 60. The edge master table may store the edge IDs and the edge types of all the edge apparatuses 60.

The edge type master table storage unit 307 stores an edge type master table. The edge type master table stores the edge type of the edge apparatus 60 installed in at least the region in question. The edge type master table may store all the edge types.

The maintenance target table storage unit 308 stores a maintenance target table. The maintenance target table stores maintenance target data including at least information required to generate data stored in the device master table.

The device type master table storage unit 309 stores a device type master table. The device type master table stores version management data, device type master management data, and communication profile management data, explained later.

The device master table storage unit 310 stores a device master table. The device master table stores common data, device data and device acquisition data, explained later.

The edge apparatus 60 implements a synchronization request unit 601 by causing the computation device to execute the program. In a case where the synchronization request unit 601 receives a synchronization instruction from the regional server apparatus 30, the synchronization request unit 601 transmits a communication profile synchronization request to the regional server apparatus 30. The communication profile synchronization request is data for requesting the regional server apparatus 30 to synchronize the communication profile, and is implemented by, for example, an HTTP request or the like.

<<Device Model>>

FIG. 4 is a drawing illustrating an example of a device model. As illustrated in FIG. 4, the device model includes one or more data items and the property (attribute values) of the data items. The property includes, for example, a current value, a maximum value, a step size, and the like. In addition, the property also includes as to whether these current value, maximum value, and step size are read-only (R), writable (W), or both (RW). Furthermore, the property includes protocol conversion information of each data item. The protocol conversion information is information for conversion between the communication protocol used by the device 70 and the communication protocol used by the edge apparatus 60.

The example as illustrated in FIG. 4 shows device model information including "ON and OFF", "preset temperature", and "intake temperature" as the data items, and also including the property of each of the data items. Accordingly, the regional server apparatus 30 and the edge apparatus 60 can collect values of the data items included in the device model.

In the present embodiment, for the sake of convenience, in the property of the device model, information other than the protocol conversion information is represented as "model information". Therefore, it is assumed that the property of each of the data items of the device model information is constituted by the model information and the protocol conversion information. For example, information obtained by converting the model information included in the device model into the JSON format becomes device type master data, and information obtained by converting the model information and the protocol conversion information included in the device model into the CSV format becomes communication profile data.

The device model as illustrated in FIG. 4 is an example, and what kind of data items are included in the device model and what the property of the data item is may be different according to the device type, the version, and the like of the device 70. For example, when the device type of the device 70 is different, the device model may be different, and even if the device 70 is of the same device type, the device model may be different if the version is different.

<<Data Stored in Device Master Table>>

FIG. 5A to FIG. 5C are drawings illustrating an example of data stored in the device type master table. As illustrated in FIG. 5A to FIG. 5C, the device type master table stores version management data, device type master management data, and communication profile management data.

As illustrated in FIG. 5A, the version management data includes items such as "creation date and time", "creator", "classification", "device type name", "version", "horse-power", "device type code", "product code", "equipment determination information", and the like. The creation date and time of the version management data is set in the "creation date and time". An ID of a person who created the version management data is set in the "creator". A character string indicative of the latest version is set in the "classification". The name indicative of the device type of the device 70 is set in the "device type name". The version of the device type is set in the "version". A numerical value indicative of the performance of the device is set in the "horse power". A code indicative of the device type is set in the "device type code". A code indicative of a product corresponding to the device 70 is set in the "product code". Information indicative of whether the device 70 is an indoor unit or an outdoor unit is set in the "equipment determination information". In addition, the version management data may include items such as, for example, an "update date" in which the update date and time of the version management data is set, an "updater" in which an ID of a person who updated the version management data is set, a "program ID" in which an ID of a program that performs processing (creation processing, update processing, and the like) of the version management data, and the like.

As illustrated in FIG. 5B, the device type master management data includes items such as "creation date and time", "creator", "classification", "model information", "device type name", "horse power", "device type code", "product code", "equipment determination information", and the like. The creation date and time of the device type master management data is set in the "creation date and time". An ID of a person who created the device type master management data is set in the "creator". The version of the device type indicated by the device type master management data is set in the "classification". Information indicating the device type master data is set in the "model information". A name indicative of the device type of the device 70 is set in the "device type name". A numerical value indicative of the performance of the device 70 is set in the "horse power". A code indicative of the device type is set in the "device type code". A code indicative of a product corresponding to the device 70 is set in the "product code". Information indicative of whether the device 70 is an indoor unit or an outdoor unit is set in the "equipment determination information". In addition, the device type master management data may include items such as, for example, an "update date" in which the update date and time of the device type master management data is set, an "updater" in which an ID of a person who updated the device type master management data is set, a "program ID" in which an ID of a program that performs processing (creation processing, update processing, and the like) of the device type master management data, and the like.

As illustrated in FIG. 5C, the communication profile management data includes items such as "communication profile", "creation date and time", "creator", "classification", "device type name", and the like. Information indicative of the communication profile data is set in the "communication profile". The creation date and time of the communication profile management data is set in the "creation date and time". An ID of a person who created the communication profile management data is set in the "creator". The version of the device type indicated by the communication profile management data is set in the "classification". A name indicative of the device type of the device 70 is set in the "device type name". In addition, the communication profile management data may include items such as, for example, an "update date" in which the update date and time of the communication profile management data is set, an "updater" in which an ID of a person who updated the communication profile management data is set, a "program ID" in which an ID of a program that performs processing (creation processing, update processing, and the like) of the communication profile management data, and the like.

In this case, the version management data and the device type master management data are associated with the device type name and the version that are set in the "device type name" and "version" of the version management data and the device type name and the version that are set in the "device type name" and "classification" of the device type master management data, respectively. Likewise, the version management data and the communication profile management data are associated with the device type name and the version that are set in the "device type name" and "version" of the version management data and the device type name and the version that are set in the "device type name" and "classification" of the communication profile management data, respectively.

Accordingly, the latest version of the version that is set in the "classification" of the device type master management data can be identified from the character string that is set in the "classification" of the version management data. Likewise, the latest version of the version that is set in the "classification" of the communication profile management data can be identified.

<<Data Stored in Device Master Table>>

FIG. 6A to FIG. 6C are drawings illustrating an example of data stored in the device master table. As illustrated in FIG. 6A to FIG. 6C, the device master table stores common data, device data, and device operation data.

As illustrated in FIG. 6A, the common data includes items such as "creation date and time", "classification", "model information", "model update date and time", "device ID", and the like. The creation date and time of the common data is set in the "creation date and time". A character string indicative of common data is set in the "classification". Information indicative of the device type master data is set in the "model information". Not only information indicative of the device type master data but also information about an address assigned to the device 70 are set in the "model information". The update date and time of information that is set in the "model information" is set in the "model update date and time". The ID of the device 70 is set in the "device ID". In addition, the common data may include items such as, for example, an "update date and time" in which the update date and time of the common data is set, a "program ID" in which an ID of a program that performs processing (creation processing, update processing, and the like) of the common data, and the like.

As illustrated in FIG. 6B, the device data includes items such as "creation date and time", "device ID", "edge ID", "device type name", "version", and the like. The creation date and time of the device data is set in the "creation date and time". The device ID of the device 70 is set in the "device ID". The edge ID of the edge apparatus 60 that controls the device 70 is set in the "edge ID". The device type name of the device 70 is set in the "device type name". The version of the device 70 is set in the "version". Which device 70 is connected to which edge apparatus 60 can be identified from the device data. In addition, the device data may include items such as, for example, an "update date and time" in which the update date and time of the device data is set, a "program ID" in which an ID of a program that performs processing (creation processing, update processing, and the like) of the device data, and the like.

As illustrated in FIG. 6C, the device operation data includes items such as "creation date and time", "classification", "device ID", "collected data", and the like. The creation date and time of the device operation data is set in the "creation date and time". A character string indicative of which data is collected from the device 70 is set in the "classification". The device ID of the device 70 is set in the "device ID". Information indicated by data collected from the device 70 is set in the "collected data". As described above, information that is set in the "collected data" includes, for example, information indicative of the ON/OFF (ON and OFF) of the power source, information indicative of the preset temperature, information indicative of the intake temperature, and the like. In addition, the device operation data may include items such as, for example, an "update date and time" in which the update date and time of the device collected data is set, a "program ID" in which an ID of a program that performs processing (creation processing, update processing, and the like) of the device collected data, and the like.

<Flow of Device Model Registration Processing>

Figure 7:
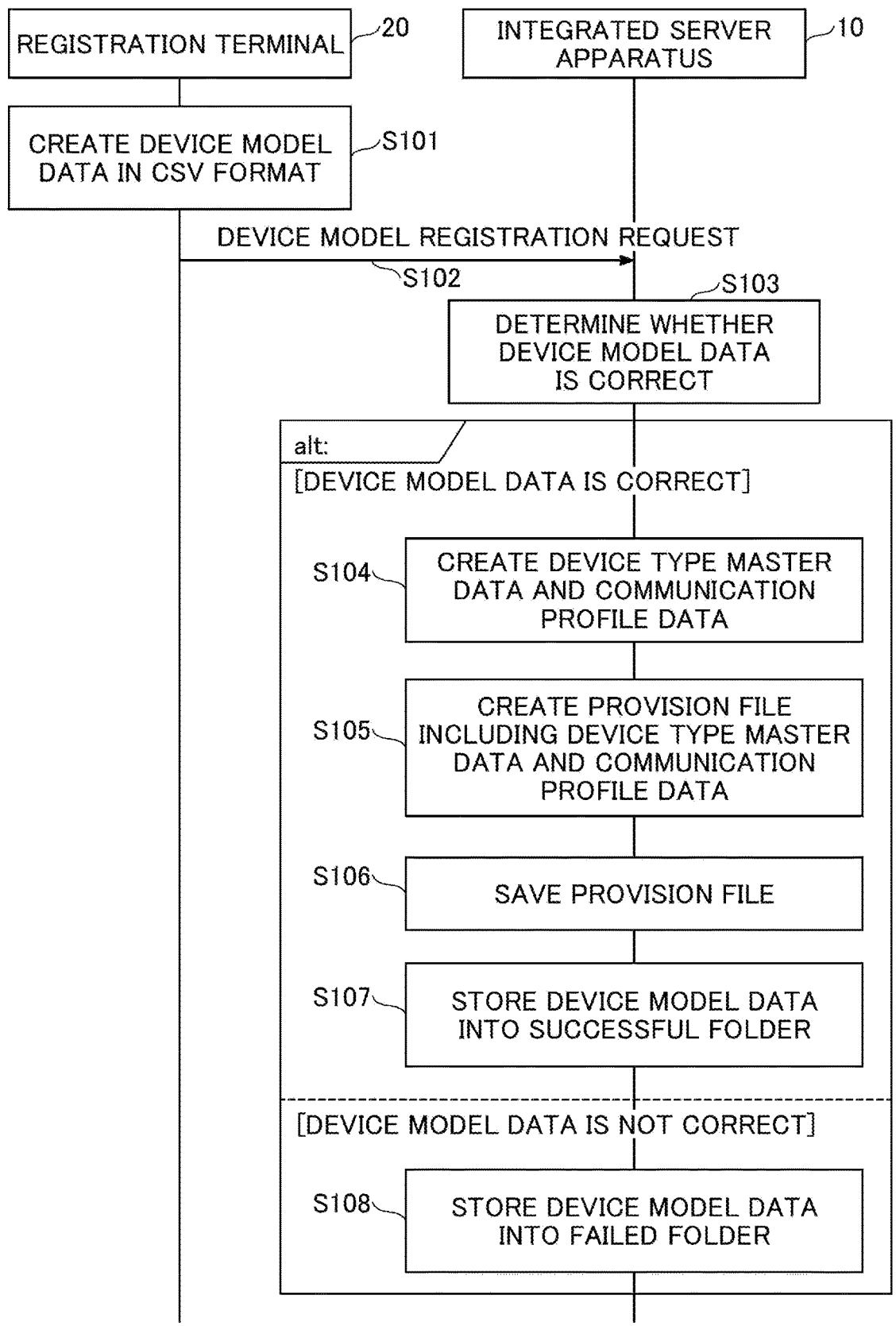
FIG. 7 is a sequence diagram (part 1) illustrating an example of a flow of device model registration processing according to the present embodiment.

First, a flow of device model registration processing from creation to saving of a provision file on the integrated server apparatus 10 is explained. FIG. 7 is a sequence diagram (part 1) illustrating an example of a flow of device model registration processing according to the present embodiment.

The registration terminal 20 creates, for example, device model data in a CSV format (step S101). For example, the device model data in the CSV format is created by converting the device model as illustrated in FIG. 4 into the CSV format. The device model data is an example of data about the device.

The registration request unit 201 of the registration terminal 20 transmits a device model registration request including the device model data to the integrated server apparatus 10 (step S102).

The file creating unit 102 of the integrated server apparatus 10 determines whether the device model data included in the device model registration request received by the request receiving unit 101 is correct (step S103).

In a case where the device model data is determined to be correct in step S103, the file creating unit 102 of the integrated server apparatus 10 creates the device type master data and the communication profile data from the device model data (step S104). The device master data is created by, for example, converting information corresponding to the model information of the device model in the information indicated by the device model data into the JSON format. The communication profile data is created by, for example, converting information indicated by the device model data into the CSV format. In a case where the device model data is in the CSV format, the device model data may be adopted as the communication profile data as it is.

Next, the file creating unit 102 of the integrated server apparatus 10 creates a provision file including the device master data and the communication profile data (step S105), and saves the created provision file in the provision file storage unit 104 (step S106). Furthermore, the file creating unit 102 of the integrated server apparatus 10 stores the device model data into a successful folder that is implemented by the successful file storage unit 105 (step S107). Accordingly, the user of the registration terminal 20 can find that the device model has been successfully registered by referring to the successful folder.

In a case where the device model data is determined not to be correct in step S103, the file creating unit 102 of the integrated server apparatus 10 stores the device model data into the failed file storage unit 106 implemented with the failed file storage unit 106 (step S108). Accordingly, the user of the registration terminal 20 can find that registration of the device model has failed by referring to the failed folder.

As described above, the file creating unit 102 stores the device model data to either the successful file storage unit 105 or the failed file storage unit 106 according to whether the provision file is created. Therefore, the file creating unit 102 is also an example of storing unit.

Figure 8:
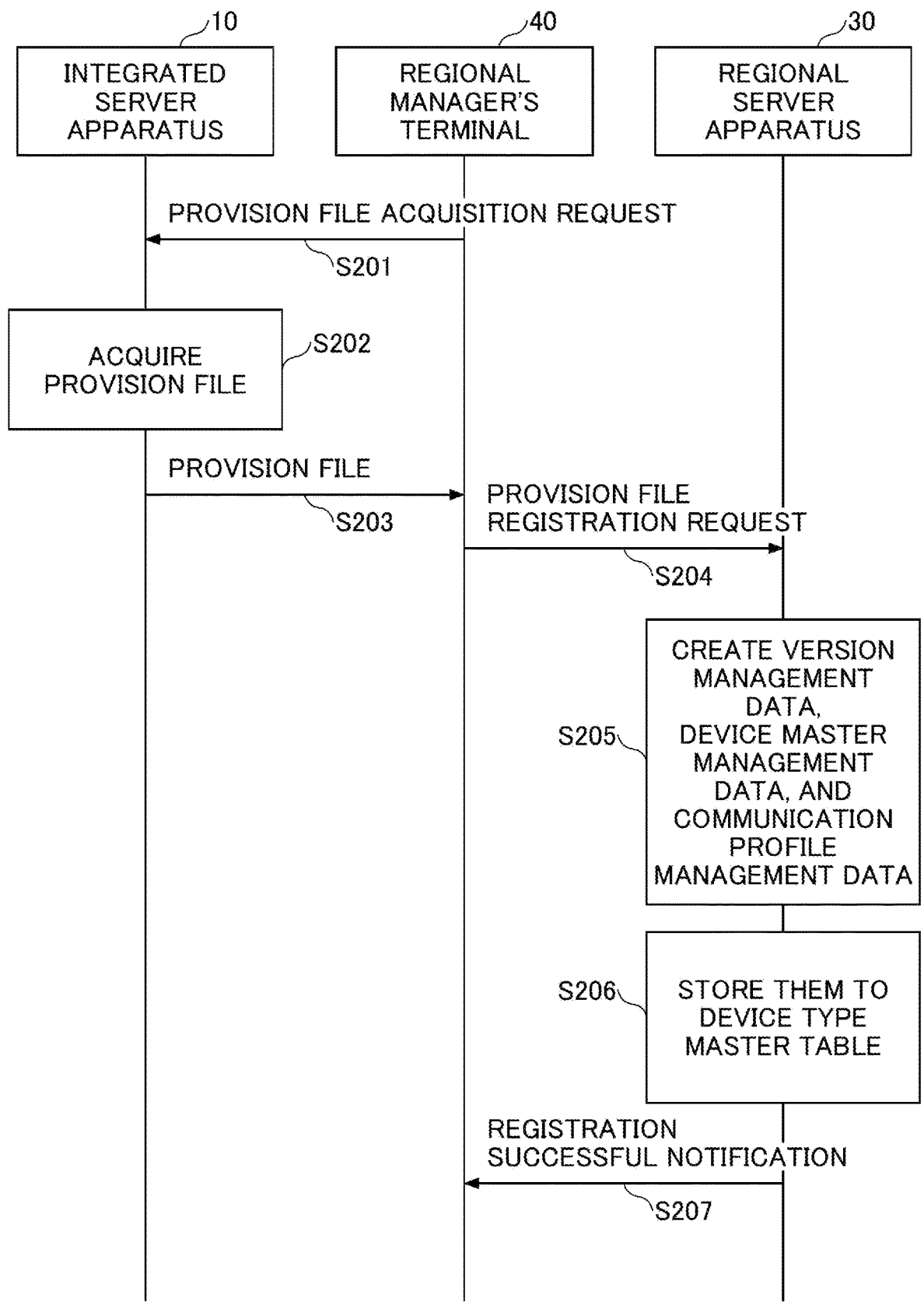
FIG. 8 is a sequence diagram (part 2) illustrating an example of a flow of the device model registration processing according to the present embodiment.

Next, a flow of device model registration processing up to registration of the device master data and the communication profile data in the regional server apparatus 30 is explained. FIG. 8 is a sequence diagram (part 2) illustrating an example of a flow of device model registration processing according to the present embodiment.

The file acquiring unit 401 of the regional manager's terminal 40 transmits a provision file acquisition request to the integrated server apparatus 10 according to, for example, regional manager's operations and the like (step S201). At this occasion, the regional manager performs an operation for specifying a provision file required by the regional server apparatus 30 managed by the regional manager. Accordingly, a specified file acquisition request for acquiring the specified provision file is transmitted to the integrated server apparatus 10.

When the file transmitting unit 103 of the integrated server apparatus 10 receives a provision file acquisition request, the file transmitting unit 103 acquires the provision file saved in the provision file storage unit 104 (step S202). Then, the file transmitting unit 103 of the integrated server apparatus 10 transmits the acquired provision file to the regional manager's terminal 40 (step S203).

When the file acquiring unit 401 receives the provision file, the registration request unit 402 of the regional manager's terminal 40 transmits a provision file registration request including information indicated by the provision file to the regional server apparatus 30 (step S204).

The registration unit 302 of the regional server apparatus 30 creates version management data, device type master management data, and communication profile management data from the information included in the provision file registration request received by the request receiving unit 301 (step S205). Then, the registration unit 302 of the regional server apparatus 30 stores the version management data, the device type master management data, and the communication profile management data, which have been created, to the device type master table (step S206). In this case, the registration unit 302 creates the device type master management data from the information indicative of the device master data in the information included in the provision file registration request, and creates the communication profile management data from the information indicative of the communication profile data.

Then, the regional server apparatus 30 transmits a registration successful notification to the regional manager's terminal 40 (step S207). Accordingly, the regional manager can find that the device master data and the communication profile data corresponding to the provision file is registered to the regional server apparatus 30.

<Flow of Device Registration Processing>

Figure 9:
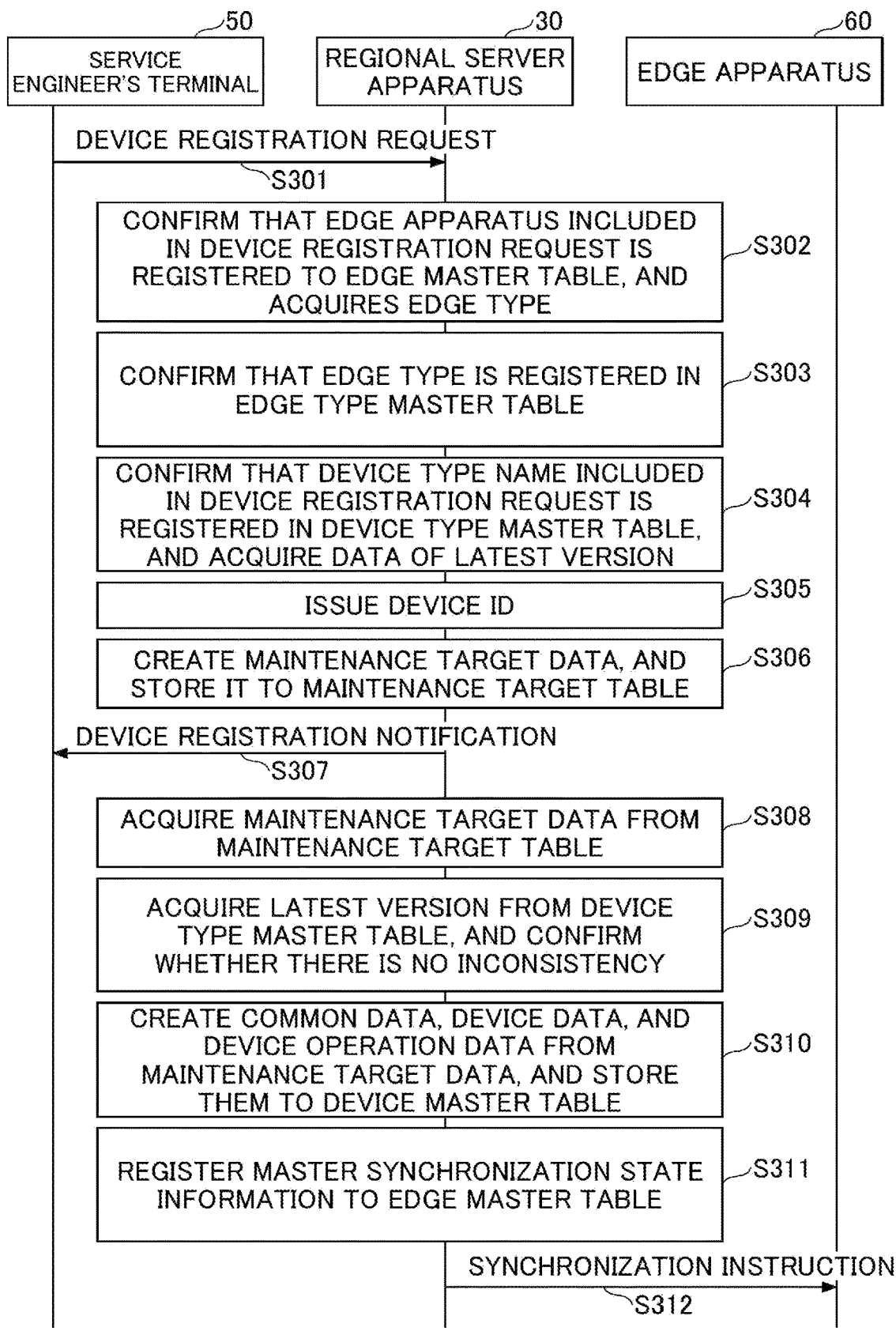
FIG. 9 is a sequence diagram illustrating an example of a flow of device registration processing according to the present embodiment.

Next, a flow of device registration processing is explained. In the device registration processing, in a case where, for example, a service engineer newly installs the device 70, the device 70 is registered to the regional server apparatus 30, and a synchronization instruction of a communication profile for collecting data from the device 70 is transmitted to the edge apparatus 60. FIG. 9 is a sequence diagram illustrating an example of a flow of device registration processing according to the present embodiment.

First, the registration request unit 501 of the service engineer's terminal 50 transmits a device registration request to the regional server apparatus 30 in response to, for example, operations of a service (step S301). In this case, for example, the service engineer specifies the device information about the device 70 of the registration target that is to be newly registered and the edge apparatus 60 controlling the device 70. Therefore, the device registration request includes at least the device information and the edge information. For example, the device information includes a device type name and the like, and the edge information includes an edge ID and the like. In addition, the device information may include, for example, an address and the like assigned to the device 70 of the registration target.

When the request receiving unit 301 receives the device registration request, the registration unit 302 of the regional server apparatus 30 confirms that the edge information included in the device registration request is registered to the edge master table, and acquires the edge type corresponding to the edge information (step S302). For example, the registration unit 302 may confirm that the edge ID included in the edge information is registered to the edge master table, and acquire the edge type corresponding to the edge ID from the edge master table. In a case where the edge information included in the device registration request is determined not to be registered to the edge master table, the regional server apparatus 30 transmits an error notification to the service engineer's terminal 50.

The registration unit 302 of the regional server apparatus 30 confirms that the edge type acquired in step S302 is registered in the edge type master table (step S303). In a case where the edge type acquired in step S302 is determined not to be registered in the edge type master table, the regional server apparatus 30 transmits an error notification to the service engineer's terminal 50.

In a case where the edge type is determined to be registered in the edge type master table in step S303, update of the edge master table may be locked so that the edge ID and the like corresponding to the edge information included in the device registration request is not deleted from the edge master table. Further, for example, in step S303, in addition to confirming that the edge type is registered in the edge type master table, for example, whether the address and the like of the device 70 of the registration target are not associated with another edge ID may be confirmed by referring to the device data stored in the device master table.

The registration unit 302 of the regional server apparatus 30 confirms that the device type name of the device information included in the device registration request is registered in the device type master table, and acquires the version management data and the device type master management data of the latest version (step S304). For example, the registration unit 302 confirms that the version management data in which the device type name included in the device information is set in the "device type name" is stored in the device type master table, and acquires the device type master management data associated with the version management data.

The registration unit 302 of the regional server apparatus 30 issues the device ID of the device 70 of the registration target (step S305).

The registration unit 302 of the regional server apparatus 30 creates the maintenance target data, and stores the created maintenance target data to the maintenance target table (step S306). For example, the registration unit 302 creates the maintenance target data including information indicative of the device ID issued in step S305, the edge ID included in the edge information, the device type name, the version, and the device type master data, and stores them to the maintenance target table. Of the above information, information other than the device ID and the edge ID is information included in the device type master management data. In addition to the above, the maintenance target data may include, for example, an address and the like assigned to the device 70 of the device ID. When the maintenance target data is stored to the maintenance target table, this means that the device 70 of the registration target is registered to the regional server apparatus 30.

The regional server apparatus 30 transmits a device registration notification indicating that the device registration has been finished to the service engineer's terminal 50 (step S307). Accordingly, the regional manager can find that the new device 70 is registered to the regional server apparatus 30.

Next, the registration unit 302 of the regional server apparatus 30 acquires the maintenance target data of the device 70 registered in step S306 from the maintenance target table (step S308).

The registration unit 302 of the regional server apparatus 30 uses the device type name and the like included in the maintenance target data acquired in step S308 to acquire the version management data, in which the device type name and the like are set, from the device type master table. Then, the registration unit 302 of the regional server apparatus 30 confirms whether there is no inconsistency between the version included in the maintenance target data and the version that is set in the "classification" of the version management data (step S309).

In a case where it is confirmed that there is no inconsistency between versions in step S309, the registration unit 302 of the regional server apparatus 30 creates common data, device data, and device operation data from the information included in the maintenance target data, and stores them to the device master table (step S310). At this occasion, no value is set or a null value is set in the "acquired data" of the device operation data. As a result, the common data including at least the information indicated by the device master data and the device ID, the device data including at least the device ID and the edge ID of the edge apparatus 60 controlling the device 70 of the device ID, and the device operation data storing data collected from the device 70 are registered to the regional server apparatus 30.

The registration unit 302 of the regional server apparatus 30 attaches master synchronization state information to data that is stored in the edge master table and that corresponds to the edge ID (step S311). The master synchronization state information is information given to the edge apparatus 60 that is to synchronize the communication profile.

The synchronization instruction unit 303 of the regional server apparatus 30 transmits a synchronization instruction to the edge apparatus 60 of the edge ID (step S312).

<Flow of Communication Profile Reflection Processing>

Figure 10:
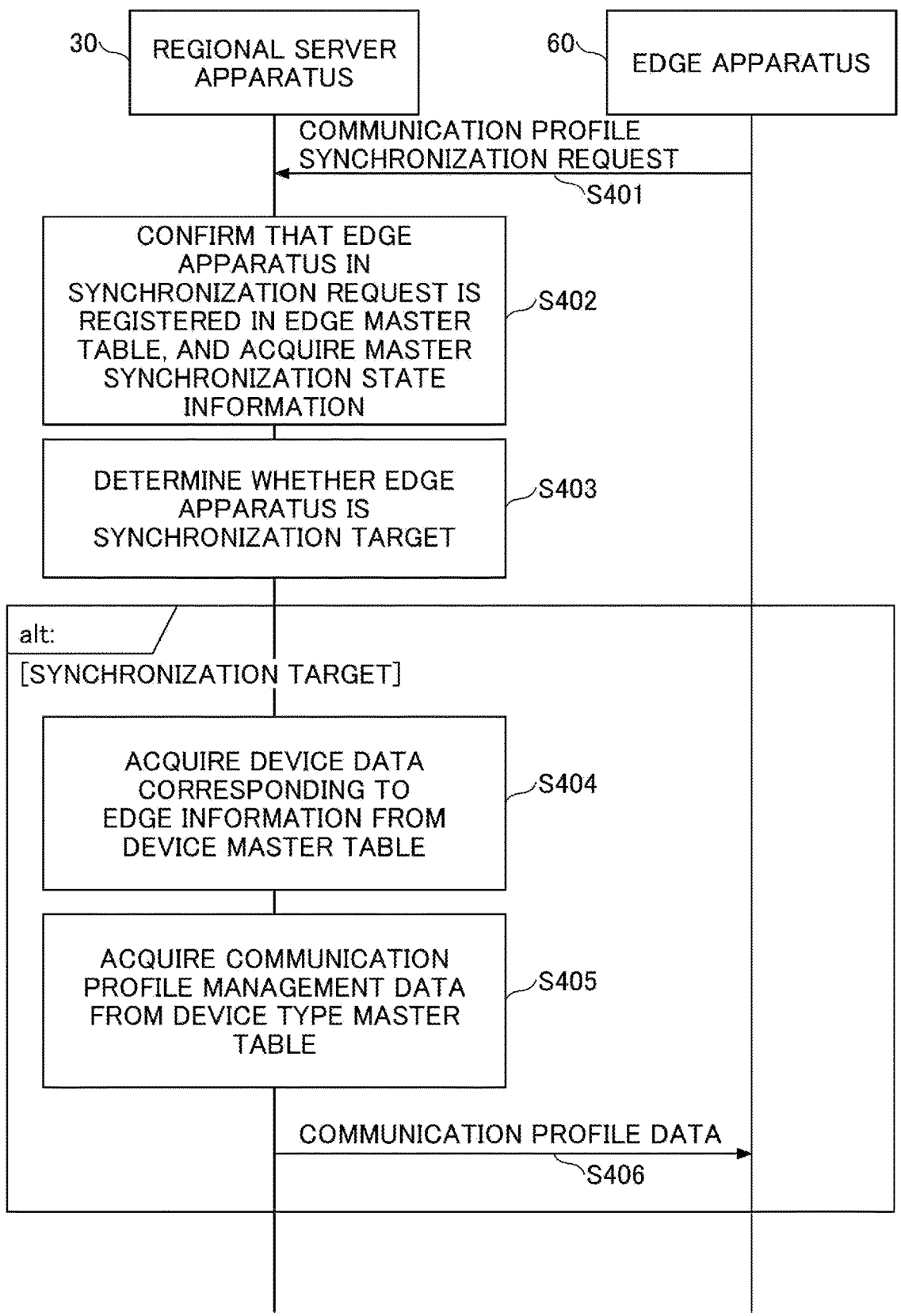
FIG. 10 is a sequence diagram illustrating an example of a flow of communication profile reflection processing according to the present embodiment.

Next, a flow of communication profile reflection processing is explained. In the communication profile reflection processing, the edge apparatus 60 receiving the synchronization instruction transmits a communication profile synchronization request to the regional server apparatus 30 to synchronize (reflect) the communication profile. FIG. 10 is a sequence diagram illustrating an example of a flow of communication profile reflection processing according to the present embodiment.

The synchronization request unit 601 of the edge apparatus 60 transmits a communication profile synchronization request to the regional server apparatus 30 (step S401). The communication profile synchronization request includes the edge information of the edge apparatus 60 and the master synchronization state information in which the null value is set.

When the request receiving unit 301 receives the communication profile synchronization request, the communication profile acquiring unit 304 of the regional server apparatus 30 confirms that the edge information included in the communication profile synchronization request is registered in the edge master table, and acquires the master synchronization state information (step S402). For example, the communication profile acquiring unit 304 confirms that the data in which the edge ID included in the edge information is set is stored in the edge master table, and acquires the master synchronization state information attached to the data.

The communication profile acquiring unit 304 of the regional server apparatus 30 determines whether the edge apparatus 60 of the transmission source of the communication profile synchronization request is the synchronization target (step S403). For example, in a case where the master synchronization state information included in the communication profile synchronization request is a null value and the master synchronization state information is acquired in step S402, the communication profile acquiring unit 304 determines that the edge apparatus 60 is the synchronization target, and in a case other than the above, the communication profile acquiring unit 304 determines that the edge apparatus 60 is not the synchronization target.

In a case where the edge apparatus 60 is determined to be the synchronization target, the communication profile acquiring unit 304 of the regional server apparatus 30 (step S404). For example, the communication profile acquiring unit 304 acquires, from the device master table, the device data in which the edge ID included in the edge information is set in the "edge ID".

Next, the communication profile acquiring unit 304 of the regional server apparatus 30 acquires, from the device type master table, the communication profile management data corresponding to the device data acquired in step S404 (step S405). For example, the communication profile acquiring unit 304 uses the device type name and the version included in the device data acquired in step S404 to acquire the communication profile management data in which the device type name is set in the "device type name" and which is associated with the version management data in which the version is set in the "version".

Then, the communication profile providing unit 305 of the regional server apparatus 30 creates communication profile data including information that is set in the "communication profile" of the communication profile management data acquired in step S405, and transmits the communication profile data to the edge apparatus 60 (step S406). Accordingly, the edge apparatus 60 can synchronize (reflect) the communication profile data. Once the communication profile data is reflected in the edge apparatus 60, the edge apparatus 60 can collect data from the device 70 by using the model information and the protocol conversion information indicated by the communication profile data.

In step S405, further, the device type master management data corresponding to the device data may be acquired, and the device master data may be created from information that is set in the "model information" of the device type master management data in step S406, and the device master data may be transmitted to the edge apparatus 60. Accordingly, the edge apparatus 60 can reflect desired data of either the communication profile data or the device master data.

Although the present embodiment has been described above, it should be understood that various changes in aspect and details can be made without departing from the subject matter and the scope of the claims. This application is based on the earlier application No. 2019-238424 filed in Japan on Dec. 27, 2019, the entire contents of which are incorporated herein by reference.

DESCRIPTION OF REFERENCE SYMBOLS 1 device management system
10 integrated server apparatus
20 registration terminal
30A, 30B regional server apparatus
40A, 40B regional manager's terminal
50A, 50B service engineer's terminal
60A, 60B edge apparatus
70A, 70B device
101 request receiving unit
102 file creating unit
103 file transmitting unit
104 provision file storage unit
105 successful file storage unit
106 failed file storage unit
201 registration request unit
301 request receiving unit
302 registration unit
303 synchronization instruction unit
304 communication profile acquiring unit
305 communication profile providing unit
306 edge master table storage unit
307 edge type master table storage unit
308 maintenance target table storage unit
309 device type master table storage unit
310 device master table storage unit
401 file acquiring unit
402 registration request unit
501 registration request unit
601 synchronization request unit

What is claimed is:

1. An information processing system comprising a first server, a second server connected to the first server, and a control apparatus connected to the second server and configured to control one or more devices,
    wherein the first server includes a first memory and a first processor coupled to the first memory and configured to:
        receive data about the one or more devices from a terminal connected to the first server; and
        create first data for the second server and second data for the control apparatus, from the received data about the one or more devices, and
    wherein the second server includes a second memory and a second processor coupled to the second memory and configured to:
        save the first data in the second memory; and
        transmit the second data to the control apparatus.

2. The information processing system according to claim 1, wherein the first processor is configured to create third data including the first data and the second data, and wherein the second processor is configured to receive the third data from the first server.

3. The information processing system according to claim 2, wherein the first processor is configured to store, in a case where the third data is created, the data about the one or more devices in a predetermined first folder or directory of the first memory, the predetermined first folder or directory indicating that the third data is successfully created, and configured to store, in a case where the third data cannot be created, the data about the one or more devices in a predetermined second folder or directory of the first memory, the predetermined first folder or directory indicating that creation of the third data has failed.

4. The information processing system according to claim 1, wherein the information processing system includes a plurality of second servers.

5. The information processing system according to claim 1, wherein the second data includes information indicated by the first data and conversion information between a communication protocol used by the control apparatus and a communication protocol used by the one or more devices, and has a data size that is less than a data size of the first data.

6. The information processing system according to claim 1, wherein the second processor is further configured to transmit the first data to the control apparatus.

7. The information processing system according to claim 1, wherein the second processor is further configured to save the second data in the second memory for each type of the one or more devices, and
wherein the second processor is configured to identify a device of the one or more devices that is controlled by the control apparatus, and transmit the second data corresponding to a type of the identified device to the control apparatus.

8. An information processing method used for an information processing system comprising a first server, a second server connected to the first server, and a control apparatus connected to the second server and configured to control one or more devices,
wherein the first server executes:
a first receiving procedure of receiving data about the one or more devices from a terminal connected to the first server; and
a creating procedure of creating first data for the second server and second data for the control apparatus, from the received data about the one or more devices, and
wherein the second server executes:
a registration procedure of saving the first data in a storage unit, the storage unit being included in the second server; and
a transmitting procedure of transmitting the second data to the control apparatus.

9. An information processing apparatus connected to a control apparatus configured to control one or more devices and connected to a terminal configured to create information about the one or more devices,
the information processing apparatus comprising a memory and a processor coupled to the memory and configured to:
receive data about the one or more devices from the terminal;
create first data for the information processing apparatus and second data for the control apparatus, from the received data about the one or more devices;
save the first data in the memory; and
transmit the second data to the control apparatus.

10. The information processing apparatus according to claim 9, wherein the processor is configured to creates third data including the first data and the second data.

11. The information processing apparatus according to claim 10, wherein the processor is configured to store, in a case where the third data is created, the data about the one or more devices in a predetermined first folder or directory of the memory, the predetermined first folder or directory indicating that the third data is successfully created, and configured to store, in a case where the third data cannot be created, the data about the one or more devices in a predetermined second folder or directory of the memory, the predetermined first folder or directory indicating that creation of the third data has failed.

12. The information processing apparatus according to claim 9, wherein the second data includes information indicated by the first data and conversion information between a communication protocol used by the control apparatus and a communication protocol used by the one or more devices, and has a data size that is less than a data size of the first data.

13. The information processing apparatus according to claim 9, wherein the processor is further configured to transmit the first data to the control apparatus.

14. The information processing apparatus according to claim 9, wherein the processor is further configured to save the second data in the memory for each type of the one or more devices, and
wherein the processor is configured to identify a device of the one or more devices that is controlled by the control apparatus, and transmit the second data corresponding to a type of the identified device to the control apparatus.

* * * * *